(12) United States Patent
Salapura et al.

(10) Patent No.: US 11,036,599 B2
(45) Date of Patent: *Jun. 15, 2021

(54) DISASTER RECOVERY AND REPLICATION ACCORDING TO WORKLOAD PRIORITIES IN DISAGGREGATED DATACENTERS

(71) Applicant: INTERNATIONAL BUSINESS MACHINES CORPORATION, Armonk, NY (US)

(72) Inventors: Valentina Salapura, Chappaqua, NY (US); John A. Bivens, Ossining, NY (US); Min Li, San Jose, CA (US); Ruchi Mahindru, Elmsford, NY (US); Eugen Schenfeld, South Brunswick, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 109 days.

This patent is subject to a terminal disclaimer.

(21) Appl. No.: 15/994,612

(22) Filed: May 31, 2018

(65) Prior Publication Data

US 2019/0370135 A1 Dec. 5, 2019

(51) Int. Cl.
*G06F 11/20* (2006.01)
*G06F 11/30* (2006.01)
*G06F 12/02* (2006.01)

(52) U.S. Cl.
CPC ...... *G06F 11/2069* (2013.01); *G06F 11/3037* (2013.01); *G06F 12/02* (2013.01)

(58) Field of Classification Search
CPC .... G06F 7/12; G06F 11/2023; G06F 11/2033; G06F 12/02; G06F 11/0709;
(Continued)

(56) References Cited

U.S. PATENT DOCUMENTS 6,182,117 B1 1/2001 Christie et al.
6,498,778 B1 12/2002 Cwilich et al.
(Continued)

FOREIGN PATENT DOCUMENTS

WO 2013053019 A1 4/2013

OTHER PUBLICATIONS

Klein, "Leveraging the Cloud for Data Protection and Disaster Recovery," Vigilant IT, https://vigilant.it/wp-content/uploads/2017/01/Leveraging-the-Cloud-for-Data-Protection-and-Disaster-Recovery.pdf, Mar. 2012 (10 pages).

(Continued)

*Primary Examiner* — Matthew M Kim
*Assistant Examiner* — Kurosu Risa Altaf
(74) *Attorney, Agent, or Firm* — Griffiths & Seaton PLLC

(57) ABSTRACT

Embodiments for disaster recovery in a disaggregated computing system. A memory pool is allocated including allocated memory elements at a secondary, disaster recovery site for data received from memory pool elements within the memory pool at a primary site. Data is continuously replicated to the allocated memory elements at the disaster recovery site. During a disaster recovery failover, a determination is made whether there are sufficient resources in the disaggregated computing system for performing workloads of a certain type. If insufficient resources are available, a disaster recovery process is initiated to re-allocate the resources for performing given workloads of the certain type.

21 Claims, 9 Drawing Sheets

(58) Field of Classification Search
CPC .. G06F 11/2069; G06F 11/3037; G06F 11/16; G06F 11/20

See application file for complete search history.

(56) References Cited

U.S. PATENT DOCUMENTS

| | | | |
|---|---|---|---|
| 8,886,796 | B2 | 11/2014 | Calder et al. |
| 8,904,231 | B2 | 12/2014 | Coatney et al. |
| 8,954,698 | B2 * | 2/2015 | Schenfeld ............ G06F 12/0292 |
| | | | 711/147 |
| 9,195,702 | B2 | 11/2015 | Bourbonnais et al. |
| 9,244,744 | B2 | 1/2016 | Bird et al. |
| 9,244,787 | B2 | 1/2016 | Chen et al. |
| 9,244,788 | B2 | 1/2016 | Chen et al. |
| 9,300,548 | B2 | 3/2016 | Asthana et al. |
| 9,400,718 | B2 | 7/2016 | Babashetty et al. |
| 9,424,152 | B1 | 8/2016 | Raut et al. |
| 9,639,439 | B2 | 5/2017 | Laicher et al. |
| 2014/0040206 | A1 | 2/2014 | Ramakrishnan et al. |
| 2014/0201314 | A1 | 7/2014 | Borkenhagen |
| 2014/0280687 | A1 | 9/2014 | Egi et al. |
| 2014/0359044 | A1 | 12/2014 | Davis et al. |
| 2015/0112931 | A1 | 4/2015 | Bourbonnais et al. |
| 2015/0113537 | A1 * | 4/2015 | Bourbonnais ......... G06F 9/5083 |
| | | | 718/103 |
| 2015/0381426 | A1 | 12/2015 | Roese et al. |
| 2016/0036924 | A1 | 2/2016 | Koppolu et al. |
| 2016/0132576 | A1 | 5/2016 | Qi et al. |
| 2016/0164753 | A1 | 6/2016 | Cimprich et al. |
| 2016/0366216 | A1 * | 12/2016 | Hack ................... H04L 67/1095 |
| 2016/0366218 | A1 | 12/2016 | Cors et al. |
| 2016/0381072 | A1 | 12/2016 | Todd et al. |
| 2017/0010922 | A1 * | 1/2017 | Bourbonnais ....... H04L 67/1095 |
| 2017/0052707 | A1 | 2/2017 | Koppolu et al. |
| 2017/0168907 | A1 * | 6/2017 | Harper .................. G06F 9/4856 |
| 2017/0293447 | A1 | 10/2017 | Bivens et al. |
| 2017/0364428 | A1 | 12/2017 | Ganesan et al. |
| 2018/0007127 | A1 | 1/2018 | Salapura et al. |
| 2018/0024775 | A1 | 1/2018 | Miller |
| 2018/0032399 | A1 * | 2/2018 | Johnson ................ G06F 11/142 |
| 2018/0095840 | A1 | 4/2018 | Ghuge et al. |

OTHER PUBLICATIONS

IBM, "Resilience in the era of enterprise cloud computing," IBM Global Technology Services, Thought Leadership White Paper, Business Continuity & Resilience Services, Jul. 17, 2014 (12 pages).

WIPRO, "Yes, You Do Need to Think About Resilience and Disaster Recovery in "The Cloud"," www.wipro.com/whitepaper, 2018 (20 pages).

BROADGROUP, "Application Disaggregation—Optimizing data centre infrastructure for smarter business putcomes"www.broadgroup.com/whitepaper, Apr. 2017 (13 pages).

Anonymous, "Method and System for Using a Disaster Recovery Orchestrator to Automate Disaster Recovery in Virtual Environments," An IP.com Prior Art Database Technical Disclosure, IP.com No. IPCOM000239752D, Dec. 1, 2014 (4 pages).

Anonymous, "A Method and System of Achieving High Availability and Disaster Recovery within Stretched Hybrid Clouds," An IP.com Prior Art Database Technical Disclosure, IP.com No. IPCOM000239022D, Oct. 1, 2014 (6 pages).

Anonymous, "Method and System for Assessing Thoroughness of a Disaster Recovery (DR) Failover Test," An IP.com Prior Art Database Technical Disclosure, IP.com No. IPCOM000234016D, Jan. 7, 2014 (2 pages).

IBM, "Disaster Recovery Dump Tool/Utility (DR Dump)," An IP.com Prior Art Database Technical Disclosure, IP.com No. IPCOM000192754D, Feb. 1, 2010 (5 pages).

Rouse, Margaret. "Memory mirroring" [online] Last modified Apr. 2013, [ retrieved on Oct. 1, 2019]. Retrieved from the Internet: URL:https//searchservicevirtualization.techtarget.com/definition/memory-mirroring 2013.

Cognet, Product Services Ethernet Point to Point [online] as of Oct. 2013, [retrieved on Oct. 18, 2019] Retrieved from the Internet: URL;https//web.archive.org/web/20131025014132/https:/cogentco.com/en/products-and-services/ethernet-services/ethernet-point-to-point 2013.

List of IBM Patents or Patent Applications Treated as Related dated Jun. 4, 2018 (2 pages).

Dufrasne et al. "IBM z/OS Global Mirror Planning, Operations, and Best Practices" (online), Publication Date: Oct. 20, 2013, retrieved on May 31, 2019. Retrieved from the Internet URL: http://www.redbooks.ibm.com/abstracts/REDP4878.html 2013.

Rouse, Margaret. "memory mirroring" [online] Last modified Apr. 2013, [retrieved on Oct. 1, 2019]. Retrieved from the Internet: (Year:2013).

Dufrasne et al, "IBM z/OS Global Mirror Planning, Operations, and Best Practices" [online], Publication Date: Oct. 20, 2013, [retrieved on May 31, 2019]. Retrieved from the Internet: (Year:2013).

Cogent Communications, Product & Services: Ethernet Services: Ethernet Point-to-Point, Mar. 29, 2018. (Year: 2018).

Cognet, Product Services Ethernet Point to Point [online] as of Oct. 25, 2013, [retrieved on Oct. 18, 2019]. Retrieved from the Internet: (Year 2013).

* cited by examiner

US 11,036,599 B2

DISASTER RECOVERY AND REPLICATION ACCORDING TO WORKLOAD PRIORITIES IN DISAGGREGATED DATACENTERS

CROSS-REFERENCE TO RELATED APPLICATIONS

This Application is related to the following four Applications having U.S. application Ser. Nos. 15/994,539, 15/994,556, 15/994,573, and 15/994,591, each filed on even date as the present Application.

BACKGROUND OF THE INVENTION

Field of the Invention

The present invention relates generally to large scale distributed computing, and more particularly, to disaster recovery and replication techniques in disaggregated computing systems.

Description of the Related Art

A popular type of large scale computing is cloud computing, in which resources may interact and/or be accessed via a communications system, such as a computer network. Resources may be software-rendered simulations and/or emulations of computing devices, storage devices, applications, and/or other computer-related devices and/or services run on one or more computing devices, such as a server. For example, a plurality of servers may communicate and/or share information that may expand and/or contract across servers depending on an amount of processing power, storage space, and/or other computing resources needed to accomplish requested tasks. The word "cloud" alludes to the cloud-shaped appearance of a diagram of interconnectivity between computing devices, computer networks, and/or other computer related devices that interact in such an arrangement.

Cloud computing may be provided as a service over the Internet, such as in the form of "Infrastructure as a Service" (IaaS), "Platform as a Service" (PaaS), and/or "Software as a Service" (SaaS). IaaS may typically provide physical or virtual computing devices and/or accessories on a fee-for-service basis and onto which clients/users may load and/or install, and manage, platforms, applications, and/or data. PaaS may deliver a computing platform and solution stack as a service, such as, for example, a software development platform, application services, such as team collaboration, web service integration, database integration, and/or developer community facilitation. SaaS may deploy software licensing as an application to customers for use as a service on demand. SaaS software vendors may host the application on their own clouds or download such applications from clouds to cloud clients, disabling the applications after use or after an on-demand contract expires.

The provision of such services allows a user access to as much in the way of computing resources as the user may need without purchasing and/or maintaining the infrastructure, such as hardware and/or software, that would be required to provide the services. For example, a user may instead obtain access via subscription, purchase, and/or otherwise securing access. Thus, cloud computing may be a cost effective way to deliver information technology services. However, cloud computing may also be hindered by issues of resource configuration and allocation aspects, and hence, there is a fundamental need to enhance and improve upon the structures and systems supporting these services.

SUMMARY OF THE INVENTION

Various embodiments for disaster recovery in a disaggregated computing system, by a processor, are provided. In one embodiment, a method comprises (a) allocating a memory pool, wherein the memory pool includes allocated memory elements at a secondary, disaster recovery site for data received from memory pool elements within the memory pool at a primary site; (b) continuously replicating data to the allocated memory elements at the disaster recovery site; (c) during a disaster recovery failover in progress, determining whether there are sufficient resources in the disaggregated computing system for performing workloads of a certain type; and (d) responsive to determining that the disaggregated computing system does not have sufficient resources, initiating a disaster recovery process to re-allocate the resources for performing given workloads of the certain type.

In addition to the foregoing exemplary embodiment, various other system and computer program product embodiments are provided and supply related advantages. The foregoing Summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
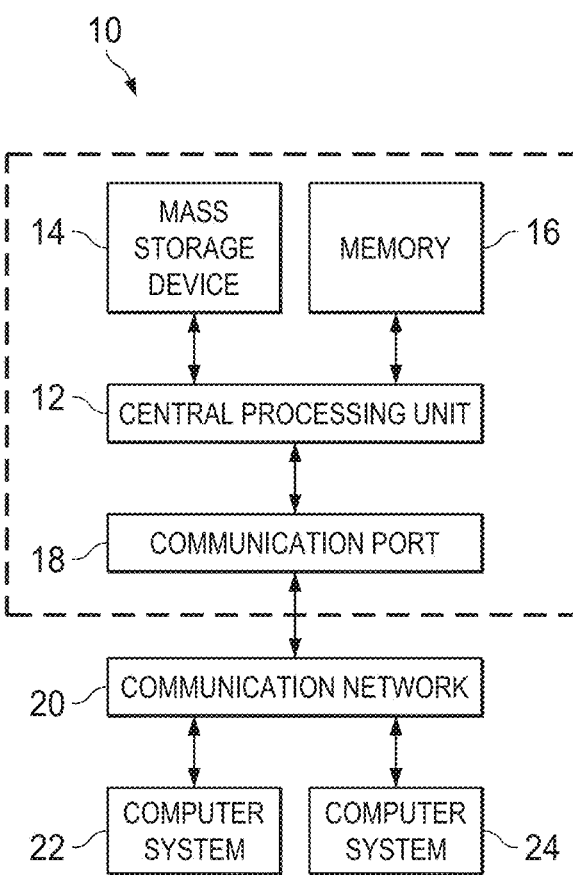
FIG. 1 is a block diagram depicting a hardware structure of a computing system, in which aspects of the present invention may be realized.

In the era of the ever increasing reliance on distributed computing, business impact of loss of information technology (IT) infrastructure can be vast and expansive. Enterprise-class clients, such as banks, financial institutions, hospitals, governments, utility companies, etc. can suffer business losses even from short outages and service interrupts. The cost of downtime could dissolve businesses, or cause irreparable brand damage, loss of customer data and loss of reputation. In order to deliver the level of resiliency needed by various enterprise applications, certain disaster recovery mechanisms need to be put in place to mitigate the impact of disaster scenarios on the infrastructure holding such sensitive data.

Cloud and digital services datacenters that provide critical services typically have business continuation, disaster recovery or disaster avoidance plans in place, in order to support continuous operation in a case of a disaster or major disruptive event. A disaster is any unforeseen event, which directly or indirectly impacts system availability beyond acceptable service levels that would result in the decision to continue operation at an alternate processing site. Disaster situations include cases in which the systems are unusable or inaccessible.

Disaster recovery plans define pre-established and documented processes of what constitutes a disaster and provide guidance when a decision must be made. The intent is to simplify the decision making process if a disaster event occurs. In a traditional, rigid system (as will be defined, following), during the disaster recovery phase, the systems within the affected and secondary datacenters are being rebuilt, and/or data are being recovered. Having a disaster recovery system in place is expensive. It requires redundant systems in place that are hot swappable and continuously mirrors the primary site information to the secondary site.

Moreover, business continuity and disaster recovery methods cannot perform actual non-interrupted service, which in the best case scenario, may require dedicated servers at remote sites to allay time spent failing over data from a primary site. Typically, disaster recovery mechanisms are implemented through snapshots being taken and stored at a primary datacenter, and then periodically copied to a secondary, remotely located datacenter. At the secondary datacenter, the service is restored to clients which normally would execute workloads at the primary datacenter by booting the servers from the snapshot images and storage, which of course takes time to initiate. Therefore and because of the expense and complexity of traditional systems, it is desirable to have a disaster recovery system in place for a disaggregated system which is flexible and of low cost, and yet allows a similar degree of flexibility and continuity as much more expensive solutions.

Accordingly, in this disclosure, techniques are contemplated to efficiently address business continuation in disaggregated datacenters during disaster scenarios. These techniques offer savings in resources needed, immediate operation continuation without interruption, and eliminate the need to wait for restart of a given service in the secondary datacenter. Further, the proposed solution eliminates the need to maintain hot standby datacenters (i.e., secondary datacenters which are constantly running with the latest replicated data from the primary datacenter) and requires a fraction of resources necessitated by a typical disaster recovery approach, yet allows immediate operational continuation without interruption.

These mechanisms include performing such functionality as continuously replicating workload and state data from a memory pool at primary site directly (using a point-to-point connection) to a memory pool at a secondary, disaster recovery site. However, when performing this replication, no compute resources and no whole servers need to be associated with the received data at the secondary site (i.e., the target datacenter). At the secondary site, the received data is written directly into disaggregated memory without requiring any compute resources (e.g., CPUs) attached or associated with the memory. In other words, a direct point-to-point connection between the memory of the primary site and the memory of the disaster recovery is employed such that data transferred therebetween does not necessitate being processed through a traditional processor bus. In the case of a disaster, the compute resources may then be connected almost instantly (10 s of Milliseconds or faster) to this memory which has the latest workload state mirrored from the primary site. Thus, the operations of the workload displaced from the primary site can resume at the secondary site almost instantly.

In the secondary datacenter, as in any other datacenter, operations performed by workloads have appropriate priority service level agreements (SLAs) to obtain resources when needed from less critical operations. Those interrupted operations or workloads do not lose their state in memory, but are rather suspended until the appropriate opportunity arises to resume them commensurate with available resources. Typically, there exists currently executing operations which can be interrupted, especially in an emergency situation.

By mirroring data to only the disaggregated memory at the secondary site, the mechanisms of the present invention save all the other associated components that typically need to be retained even while not active, such as processors, accelerators, networking components, etc. Those components can be used by other applications at the secondary, disaster recovery site until a disaster recovery scenario occurs and are therefore not wasted. This is especially useful because normally, at a most redundant level and as aforementioned, dedicated servers must be kept on standby whereby the workload data of the primary site is mirrored to the secondary site. However, because disaster recovery scenarios are generally not daily occurrences, this wastes a vast amount of resources because the servers are merely "waiting" for a failover from the primary site to occur. Thus, by allowing the secondary site to conduct normal workload operations and only utilize components therein during an actual failover, these resources are much more efficiently utilized while still retaining the benefits of having the dedicated standby servers ready. Further, by using different SLA levels and priorities, these resources may be controlled at a much more granular level to be efficiently used on those rare cases when a disaster occurs.

As mentioned, disaggregated memory to disaggregated memory mirroring does not process data through a server with a typical network and operation protocol (such as Ethernet and TCP/IP over Internet). Instead, the disaggregated architecture discussed herein facilitates efficient memory pool to memory pool data mirroring from the primary datacenter site to the secondary, disaster recovery site. This may be accomplished through a dedicated utility company or telco-provided networking line, of which are usually within 100 miles distance. The utility provider can architect their backbone network using a connection and protocol to provide such point-to-point circuits that physically or virtually facilitate continuous memory pool to memory pool mirroring, and allocate appropriate backbone bandwidth provided only for critical applications that require such service.

Disaggregated System Description

The techniques of this disclosure preferably are implemented within the context of a "disaggregated" computing system wherein a "disaggregated server"—sometimes referred to herein as a "server entity"—is dynamically constructed/composed or constitutes server resources selected from (or assigned from) shared server resource pools, namely, one or more of: a compute pool, a memory pool, an accelerator pool (e.g., a graphical processing unit (GPU) accelerator, a network accelerator, etc.), and a storage pool. As the nomenclature suggests, a "compute" pool typically constitutes physical processors (such as central processing units (CPUs)), a "memory" pool typically constitutes physical memory devices (such as dual-inline-memory modules (DIMM)), etc. A given shared pool preferably includes just the particular resource types, but a particular resource pool may be composed of one or more resource sub-types. The notion of a "pool" is not intended to be limiting, as the common resources may be collected, aggregated or otherwise combined in any suitable manner. Further, a "pool" may be a dedicated set of resources that have the common type or sub-type, or some ad hoc collection of such resources. Preferably, a particular server entity comprises server resources from one or more of the server resource pools.

Disaggregated computing systems provide flexibility and elasticity in constructing bare-metal computing systems for use in the cloud, to provide on-demand flexibility to cloud users, or "tenants". As mentioned, a disaggregated computing system is referred to as a system with large pools of physical hardware resources, such as CPUs, accelerators, memory devices, and storage devices, whose connectivity with each other individual hardware resource can be dynamically switched without shutting down any hardware nor running applications. Individual hardware resources from these pools can be selected to assemble computer systems on-demand. Thus, a bare-metal computer system with a flexible capacity of individual computing resources may be assembled in a disaggregated system, such that workloads are computed based on hardware resource configurations that are most suitable for the respective workload. In one embodiment, for example, a system may be constructed with an extremely high capability of memory size but with a more moderate capacity of CPU and other resources, for a memory-intensive workload. This functionality is enabled by the use of point-to-point circuit wire level switching. In other words, components, on a bare-metal wire level (e.g., using optical memory architecture functionality), are connected in mere milliseconds to assemble a given system or allocate/de-allocate individual components of the given system. All disaggregated system proposals currently known in the art are copy-based systems in which a process state is copied over a memory fabric to local memory at the computation hardware because of the latency in connecting directly to the pool over the memory fabric or over a symmetric multiprocessing (SMP) system. This means that switching between computing components cannot happen in milliseconds as can the point-to-point circuit wire level switching mechanisms used in the present invention thereby enabling a continuous, instantaneous execution of processes even while the computing components are switched.

One advantageous component of disaggregated computing systems is the opportunity to perform computation between various hardware resources in ways previously unattainable. For example, in most pre-configured computing systems, pre-fetching techniques and data locality help to keep cache hit rates high, enabling ultra-fast performance for the end user. However, if the processor spends a vast amount of time finding the needed data in the cache, it may be under-utilizing bandwidth to main memory. Since the disaggregated architecture permits additional processing components to be connected to various memory pool modules, a method to better utilize this bandwidth to memory modules is proposed by efficiently connecting to the memory modules from other processing components (during times of low usage) to perform analytic functions which may lead to valuable insights about the data, or its processing. Such memory access will not pass through the usual SMP fabric connecting processors, and hence does not disturb inter-processor communication and coherency when really needed, increasing efficiency further.

In another example, and in the context of the present invention, the architecture of disaggregated computing systems may be leveraged to dynamically construct a server entity of various physical resources according to the physical locality of the data and the underlying resources needed to complete workloads utilizing this data. Consider that typical resource allocation mechanisms would attempt, for a single computer system, to allocate resources that are physically close to one another to reduce system latency. However, depending on a workload's data access patterns executed by this computer system, these allocations (even as they may be physically close together) may have little or no effect on performance and could lead to fragmented and non-optimal results for the larger disaggregated framework (as the actual locality of the underlying data may be different than the locality of the resources performing the workload). Accordingly, considered is a mechanism for continual resource allocation optimization which leverages observed system behavior (e.g., data access patterns) and the unique, resource allocation capabilities of the disaggregated system to dynamically re-align compute resources to data in a way not possible in traditional systems. This re-alignment of system resources will serve to strike a better balance between the overall disaggregated framework utilization and the performance of each dynamic hardware system.

It should be noted that the instant disclosure, for brevity, frequents the language of "resources". In an actual implementation of the present invention, the resources termed herein may be comprised of CPUs, graphical processing units (GPUs), memory, storage devices, network devices, accelerator devices, etc. which are, again, generally pooled together in a shared resource pool fashion. Indeed, any hardware and/or software resources as commonly known in the art are to be construed interchangeably with "resources" or "resource types" as described herein, as one practicing the art would appreciate.

Typically, the shared resource pools are available within the physical confines of a particular datacenter, although this likewise is not a limitation. Thus, the shared resource pools themselves may be shared across physical datacenters. Further, a particular server entity is not required to be composed of resources from each of the server pools.

By way of background, but not by way of limitation, the following describes a representative computer environment in which the techniques of this disclosure (described below) may be practiced.

Turning now to FIG. 1, exemplary architecture 10 of a general computing environment in which the disaggregated compute system of this disclosure may be implemented and/or comprised of is depicted. The computer system 10 (which may also be referred to as "cloud computing node" 10) includes CPU 12, which is connected to communication port 18 and memory device 16. The communication port 18 is in communication with a communication network 20. The communication network 20 and storage network may be configured to be in communication with computer systems (hosts) 24 and 22 and storage systems, which may include storage devices 14. The storage systems may include hard disk drive (HDD) devices, solid-state devices (SSD) etc., which may be configured in a redundant array of independent disks (RAID). The operations as described below may be executed on storage device(s) 14, located in system 10 or elsewhere and may have multiple memory devices 16 working independently and/or in conjunction with other CPU devices 12. Memory device 16 may include such memory as electrically erasable programmable read only memory (EEPROM) or a host of related devices. Memory device 16 and storage devices 14 are connected to CPU 12 via a signal-bearing medium. In addition, CPU 12 is connected through communication port 18 to a communication network 20, having an attached plurality of additional computer systems 24 and 22. In addition, memory device 16 and the CPU 12 may be embedded and included in each component of the computing system 10. Each storage system may also include separate and/or distinct memory devices 16 and CPU 12 that work in conjunction or as a separate memory device 16 and/or CPU 12.

It is further understood in advance that although this disclosure includes a detailed description on cloud computing, following, that implementation of the teachings recited herein are not limited to a cloud computing environment. Rather, embodiments of the present invention are capable of being implemented in conjunction with any other type of computing environment now known or later developed.

As previously eluded to, cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes and storage systems (e.g. storage subsystem 20).

Figure 2:
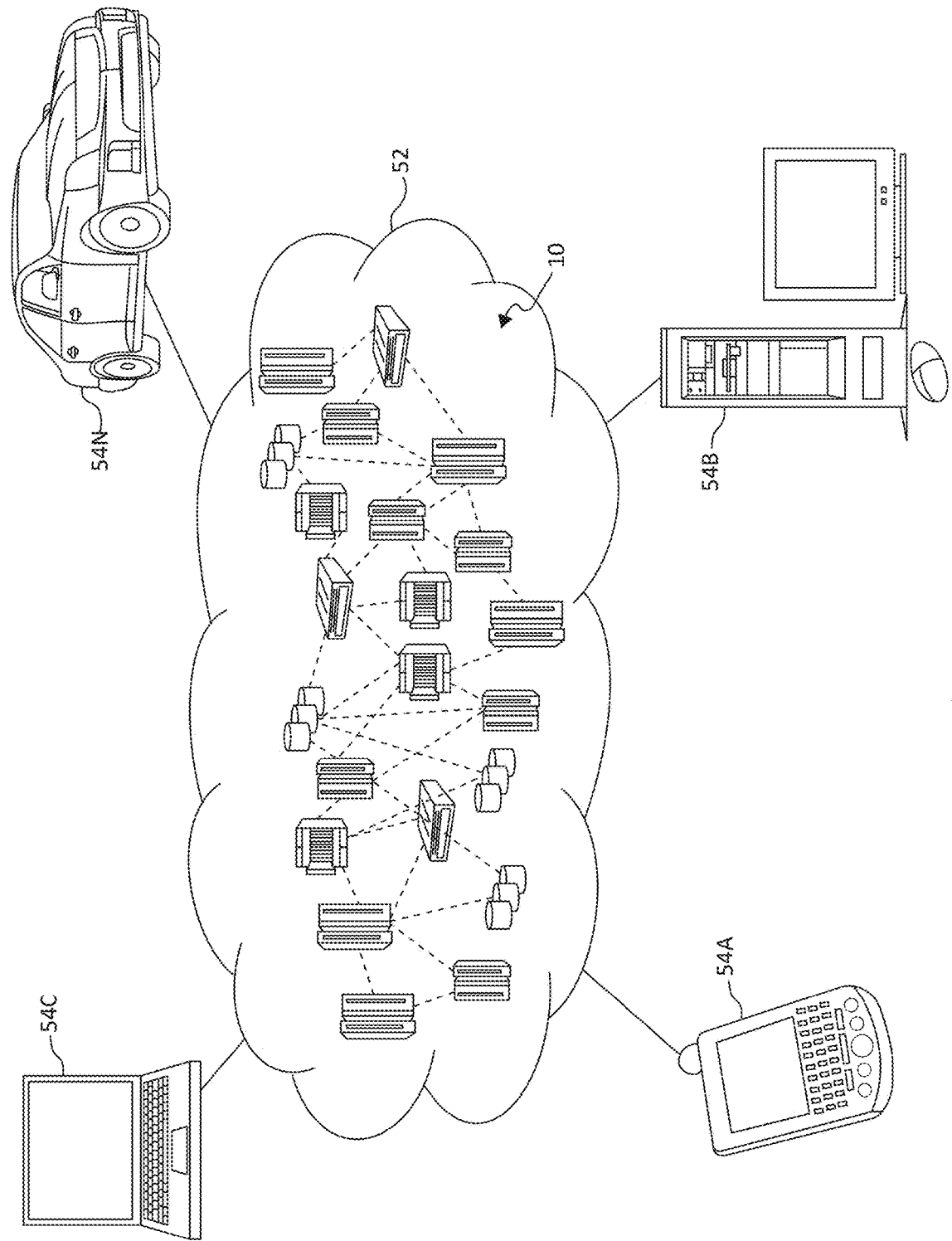
FIG. 2 is a block diagram of an exemplary cloud computing environment according to embodiments of the present invention.

Referring now to FIG. 2, illustrative cloud computing environment 52 is depicted. As shown, cloud computing environment 52 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 52 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 52 can communicate with any type of computerized device over any type of network and/or network addressable connection (e.g., using a web browser).

Figure 3:
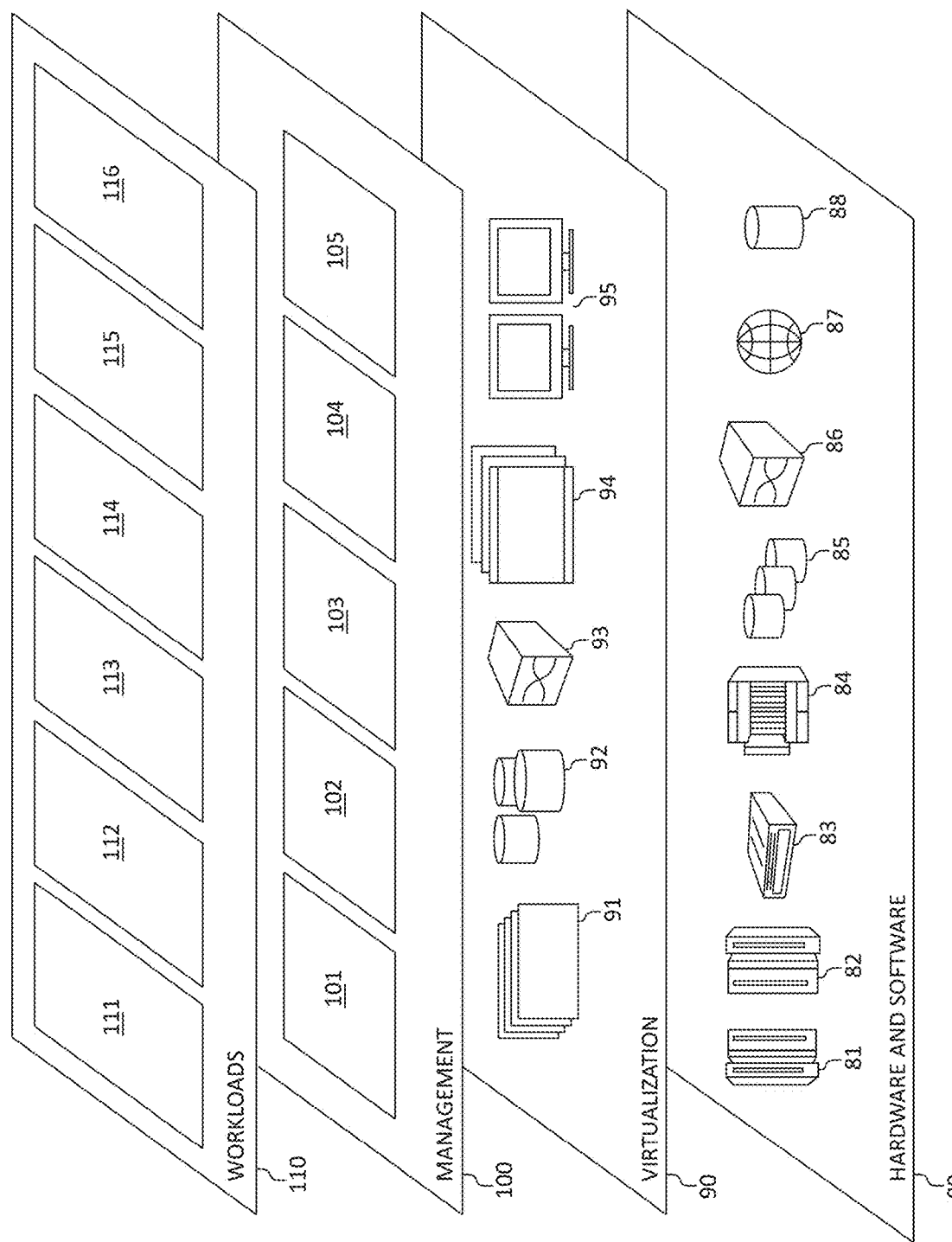
FIG. 3 is a block diagram depicting abstraction model layers according to embodiments of the present invention.

Referring now to FIG. 3, a set of functional abstraction layers provided by cloud computing environment 52 (FIG. 3) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 80 includes hardware and software components. Examples of hardware components include: mainframes 81; RISC (Reduced Instruction Set Computer) architecture based servers 82; servers 83; blade servers 84; storage devices 85; and networks and networking components 86. In some embodiments, software components include network application server software 87 and database software 88.

Virtualization layer 90 provides an abstraction layer from which the following examples of virtual entities may be provided: virtual servers 91; virtual storage 92; virtual networks 93, including virtual private networks; virtual applications and operating systems 94; and virtual clients 95.

In one example, management layer 100 may provide the functions described below. Resource provisioning 101 provides dynamic procurement of computing resources and other resources that are utilized to perform tasks within the cloud computing environment. Metering and Pricing 102 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 103 provides access to the cloud computing environment for consumers and system administrators. Service level management 104 provides cloud computing resource allocation and management such that required service levels are met. Service Level Agreement (SLA) planning and fulfillment 105 provides pre-arrangement for, and procurement of, cloud computing resources for which a future requirement is anticipated in accordance with an SLA.

Workloads layer 110 provides examples of functionality for which the cloud computing environment may be utilized. Examples of workloads and functions which may be provided from this layer include: mapping and navigation 111; software development and lifecycle management 112; virtual classroom education delivery 113; data analytics processing 114; transaction processing 115; and, in the context of the illustrated embodiments of the present invention, various resource monitoring and allocation functionality 116. One of ordinary skill in the art will appreciate that the resource monitoring and allocation functionality 116 may also work in conjunction with other portions of the various abstractions layers, such as those in hardware and software 80, virtualization 90, management 100, and other workloads 110 (such as data analytics processing 114, for example) to accomplish the various purposes of the illustrated embodiments of the present invention.

Figure 4:
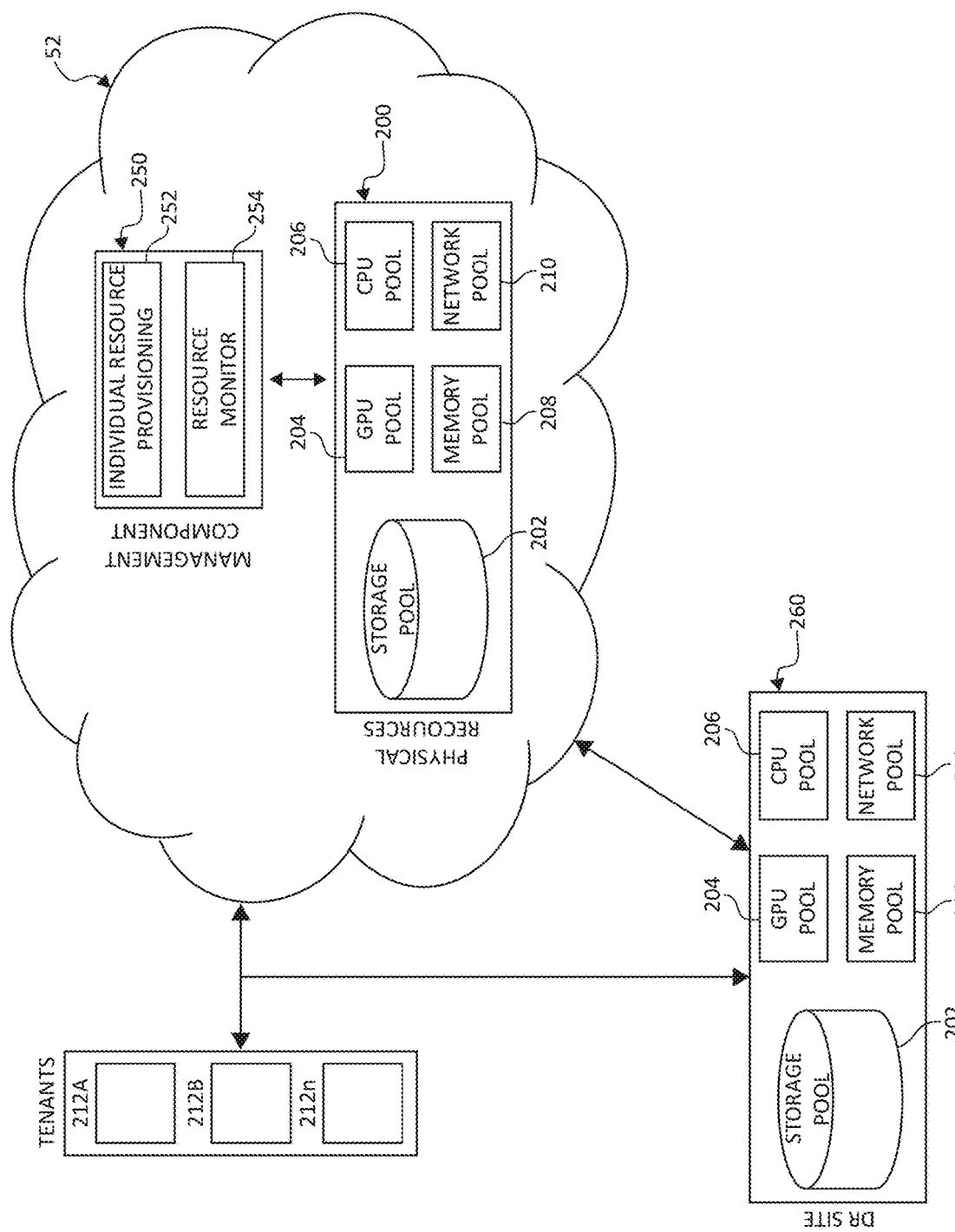
FIG. 4 is a block diagram depicting a hardware structure of a disaggregated computing environment, in which aspects of the present invention may be realized.

Turning now to FIG. 4, a block diagram of a disaggregated computing architecture is illustrated, of which is included in the cloud computing environment 52. Within cloud computing environment 52 is the disaggregated computing system comprising physical hardware resources 200. Physical hardware resources 200 may comprise of classifications of the hardware resources such as a storage device pool 202, a GPU device pool 204, a CPU device pool 206, a memory device pool 208, and a network device pool 210. The physical hardware resources 200 are in communication with a management module 250. Management module 250 may comprise of such components as an individual resource provisioning component 252 and a resource monitor 254, each described herein.

In communication with the cloud computing environment 52, the management module 250, and the physical hardware resources 200, are tenants 212A, 212B, and 212n. Tenants 212A, 212B, and 212n may communicate with the cloud computing environment 52 by way of the management module 250, and thus the physical resources 200 provided by any signal-bearing medium.

It should be noted that the elements illustrated in FIG. 4 provide only an example of related components that may be included in the disaggregated computing architecture. For example, management module 250 may include other components than individual resource provisioning component 252 and resource monitor 254, and physical hardware resources 200 may include other component classifications than storage device pool 202, GPU device pool 204, CPU device pool 206, and memory device pool 208, and network pool 210, while staying in the spirit and scope of the present invention. Additionally, the duties of the management module 250, and thus the components therein, may be performed and comprised of physical components, computer code, or a combination of such.

In one embodiment, the management module 250 interacts with individual tenants 212A-n to receive workload requests and locate the best suitable hardware resources for the given workload. Individual hardware resources of the physical hardware resources 200 are tracked and a mapping is maintained between each respective tenant 212A-n and respective assigned hardware resource. Each hardware resource is identified using a unique identifier. This identifier may be a physical identifier (e.g., barcode) and/or a virtual identifier (e.g., code based). The management module 250, or any other suitable modules or means known in the art may be used to accomplish these mechanisms.

Still referring to FIG. 4, a disaster recovery site 260 is additionally shown, where the disaster recovery site 260 is in communication within the cloud computing environment 52 with the physical resources 200 and the tenants 212A-n. In other words, physical resources 200 may be identified as a primary site which is in communication with the DR site 260, and both the primary site comprising the physical resources 200 and the disaster recovery site 260 are in communication with the tenants 212A-n. The disaster recovery site 260 may provide failover functionality to the primary site comprising the physical resources 200, such that during a disaster recovery scenario, workloads executing within the primary site comprising the physical resources 200 may be transitioned to execute within the disaster recovery site 260. In some implementations, the primary site comprising the physical resources 200 may be physically located at a sufficient distance (i.e., many miles) away from the disaster recovery site 260 to mitigate impact of an actual disaster on both sites (such that the disaster scenario does not encompass both sites). In other implementations, the disaster recovery site 260 may be located closer or even within the same datacenter as the primary site comprising the physical resources 200.

The disaster recovery site 260 may comprise many of the same components as the primary site comprising the physical resources 200, where these resources are, similar to the primary site, assembled into disaggregated computing systems dynamically at the disaster recovery site 260. In other words, the disaster recovery site may also comprise a substantially similar set of physical resources 200 including the storage pool 202, the GPU pool 204, the CPU pool 206, the memory pool 208, and the network pool 210. Preferably yet not necessarily, the disaster recovery site 260 is at least partially similar in size and scope with regard to the number and amount of component resources as the primary site comprising the physical resources 200 such that the disaster recovery site 260 is able to execute (at least partially) the influx of workloads failed over from the primary site associated with an actual disaster scenario, however various techniques to integrate these workloads in view of available component levels according to determined priorities are discussed further herein.

Figure 5:
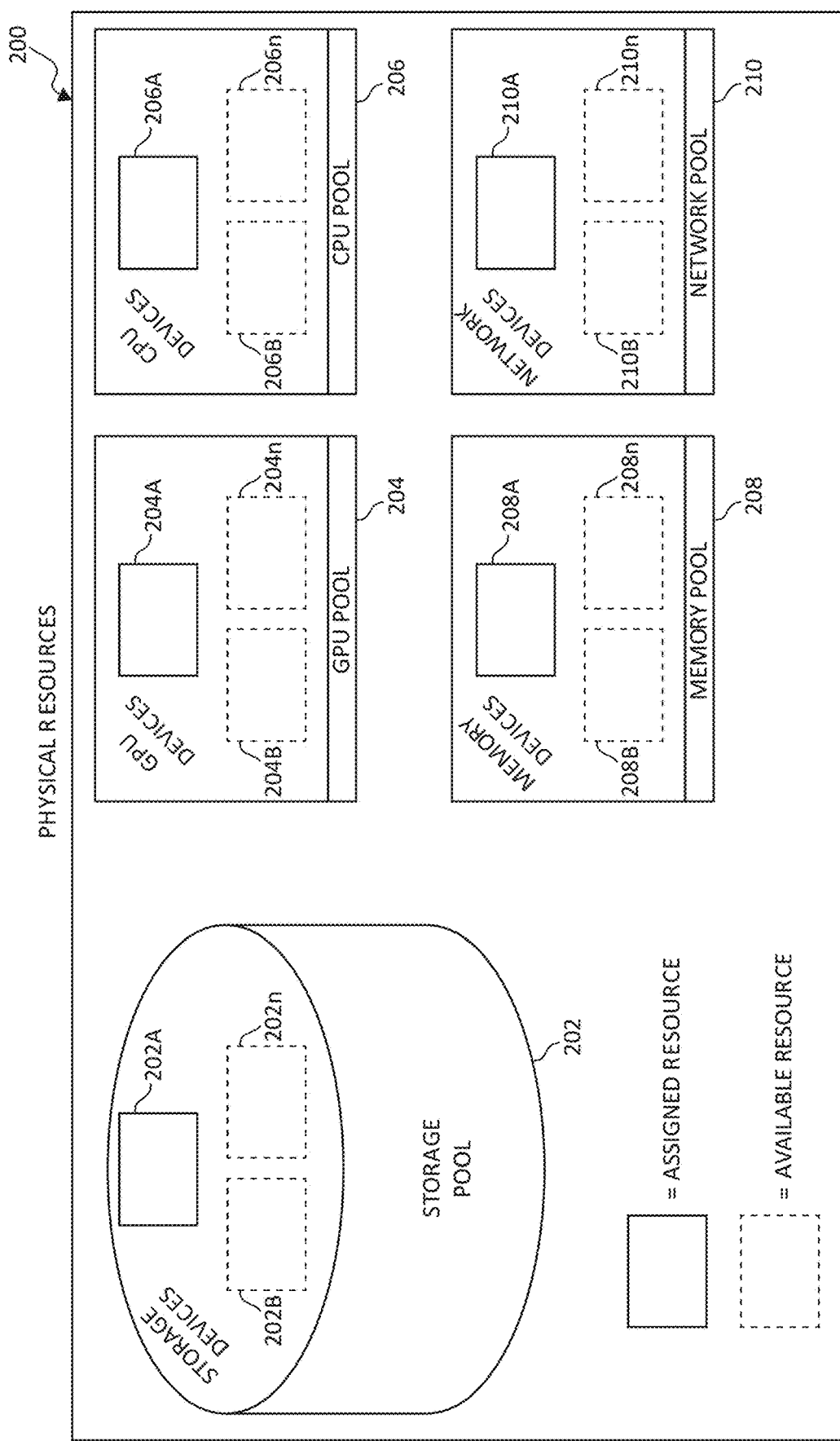
FIG. 5 is an additional block diagram depicting a hardware structure of a disaggregated computing environment, in which aspects of the present invention may be realized.

FIG. 5 is a block diagram illustrating the physical hardware resources 200 portion of FIG. 4. Included in the storage device pool 202 are storage devices 202A, 202B, and 202n. The GPU device pool 204 includes GPU devices 204A, 204B, and 204n. The CPU device pool 206 includes CPU devices 206A, 206B, and 206n. The memory device pool 208 includes memory devices 208A, 208B, and 208n. Finally, the network device pool 210 includes network devices 210A, 210B, and 210n. Each aforementioned hardware resource may be in communication with an additional one or more aforementioned hardware resources via a signal-bearing medium.

Within physical hardware resources 200, each hardware resource appearing in solid line (i.e., storage device 202A, GPU device 204A, CPU device 206A, memory device 208A, and network device 210A) are assigned hardware resources to one or more tenants (i.e., tenants 212A, 212B, 212n). Hardware resources appearing in dashed line (i.e., storage devices 202B, 202n, GPU devices 204B, 204n, CPU devices 206B, 206n, memory devices 208B, 208n, and network devices 210B, 210n) are unassigned hardware resources which are available on-demand for a respective tenant 212A-n workload.

Each respective tenant 212A-n may be assigned individual respective hardware resources 200 in arbitrary quantities. In one embodiment, each respective tenant 212A-n may be assigned an arbitrary quantity of an individual respective hardware resource 200 within a limit of total system capacity and/or an available quantity of the respective hardware resources 200. For example, a memory device 208A-n allocated from the memory pool to a respective tenant 212A-n may be provided in a minimal unit of allocation (e.g., a byte or word) up to a limit of total system capacity and/or an available quantity of the memory devices 208A-n.

In another embodiment, each respective tenant 212A-n may be assigned individual respective hardware resources 200 within a quantum step sizing restriction. For example, memory devices 208A-n may need to be allocated on quantum sizes of full or half of memory DIMM units, to assure full bandwidth from the respective memory device 208A-n to the processor when reading/writing data. This is especially true in a disaggregated system since the memory device 208A-n is directly connected via fiber/optical switch to the processor memory unit (for read/write memory transactions) as if it was locally connected to the processor chip, but rather may be a small distance (e.g., 1 meter) away in location. In another example, because the disaggregated system is not based on virtual components but rather physical components (i.e., actual chips than cores or VMs), the quantum sizing restriction may require that a minimum of one CPU device 206A-n be assigned to a tenant 212A-n, with additional CPU devices 206A-n being provisioned to the tenant 212A-n in two, four, etc. quantities.

Disaster Recovery in Disaggregated Datacenters

Having described one or more architectures in which the functionality of the present invention may employ and as previously discussed, in various embodiments, the functionality of the present invention leverages the point-to-point circuit wire level switching and hardware pooling attributes of disaggregated systems to provide an efficient mechanism providing data replication during disaster recovery scenarios. As aforementioned, in this type of disaggregated system, like resources are organized into pools which can be directly connected to resources of another pool. An effectively provisioned "system" will be composed of a set of computing resources connected in a point-to-point fashion to memory and storage resources, etc.

In current typical disaster recovery solutions, one or more disaster recovery datacenters are identified and allocated as a disaster recovery site. Several different implementations exist as to how the disaster recovery datacenters are configured (e.g., if these datacenters are multi-active, or they are in a standby mode (such as hot standby, warm standby or cold standby)). Following are some of the typical configurations used:

Cold Standby:

In a cold-standby approach, at the disaster recovery site, no servers and no data from the primary site are available. In a disaster event, recovery servers need to be provisioned and configured, and data from the primary site then must be provided. In some implementations, data might need to be copied from the backup of the primary site over the network, or data from the backup may need to be transferred to the disaster recovery site. In order to restart execution, servers at the disaster recovery site must be rebuilt and data must be uploaded to the memory thereof.

Warm Standby:

In a warm standby approach, at the disaster recovery site, all servers are configured and set up identical to the primary site. In a disaster event, the servers might need to boot to start execution of workloads failed over from the primary site, and no data from the primary site is available. In some implementations, data might need to be copied from the backup of the primary site over the network, or data from the backup may need to be transferred to the disaster recovery site. In order to restart execution, servers and data must be uploaded to the memory thereof.

Hot Standby:

In a hot standby approach, the disaster recovery site maintains all servers configured and ready to use, and all data is replicated from the primary site to the disaster recovery. No processing is done at the disaster recovery site until a failover occurs from the primary site. While data is readily available and all servers are up and running, the disaster recovery datacenter is in a standby mode. In this approach, the disaster recovery site can switch into operation within minutes. Of note, the hot standby approach is one of the more expensive disaster recovery solutions currently known in the art.

Active-Active:

In an active-active approach, two datacenters serve as a disaster recovery site for one another. Both datacenters (both sites) are operating and executing portions of the workload or input requests, and have available resources for the disaster recovery purposes of another site. Data processed at one site is replicated to the remote site, and is kept updated in the memory of the disaster recovery site. Losing one datacenter during a failover results in all processing requests arriving to the secondary site.

Generally, all current systems replicate data from the primary site into the storage (not memory) of the secondary site. In order to get the secondary site to operate, a server has to be booted on the secondary site to load the image from the storage (e.g., disk or tape storage) into the memory, and to start operating. Through their inherent flexibility, however, disaggregated systems offer a new level of reacting to a disaster event, enabling low cost disaster recovery solutions and providing undisrupted operation to the end user by directly copying data from the memory of the primary or first site into the memory of the secondary, disaster recovery site.

This is because, again, in disaggregated systems designed for disaster recovery, the disaggregated system implements memory pool to memory pool data copy, where data is replicated from the primary site into the memory of the secondary, disaster recovery site. On the secondary, disaster recovery site, only destination memory is assigned, however the disaggregated system does not allocate and "attach" compute and other system resources to this memory.

On the secondary site, the image data received from the primary site is copied into the memory, and this image data within the memory is continuously updated. Then, as previously mentioned, because in a disaggregated system compute resources can be assigned to memory and storage within milliseconds, compute resources can then be assigned to the memory image maintained within the memory of the secondary site almost instantaneously, and hence no servers must be booted from storage. In a situation where the secondary site must be promoted into the primary site, the processors are allocated and assigned to the memory image, and a completely operational system is in place to continue executing the failover workload(s) from the primary site. The present invention thus details embodiments for setting up this replication system, executing the failover from the primary site to the disaster recovery site by re-allocating resources away from opportunistic workloads at the disaster recovery site to critical workloads accepted from the primary site, determining and defining SLA priorities for performing these critical and other workloads associated with both sites, defining a degree of resiliency of workloads commensurate with the defined SLA priorities, and providing an orchestration and capacity planning mechanism to ensure that the critical workloads will execute while respecting the overall SLAs of all workloads executing at the disaster recovery site.

Figure 6:
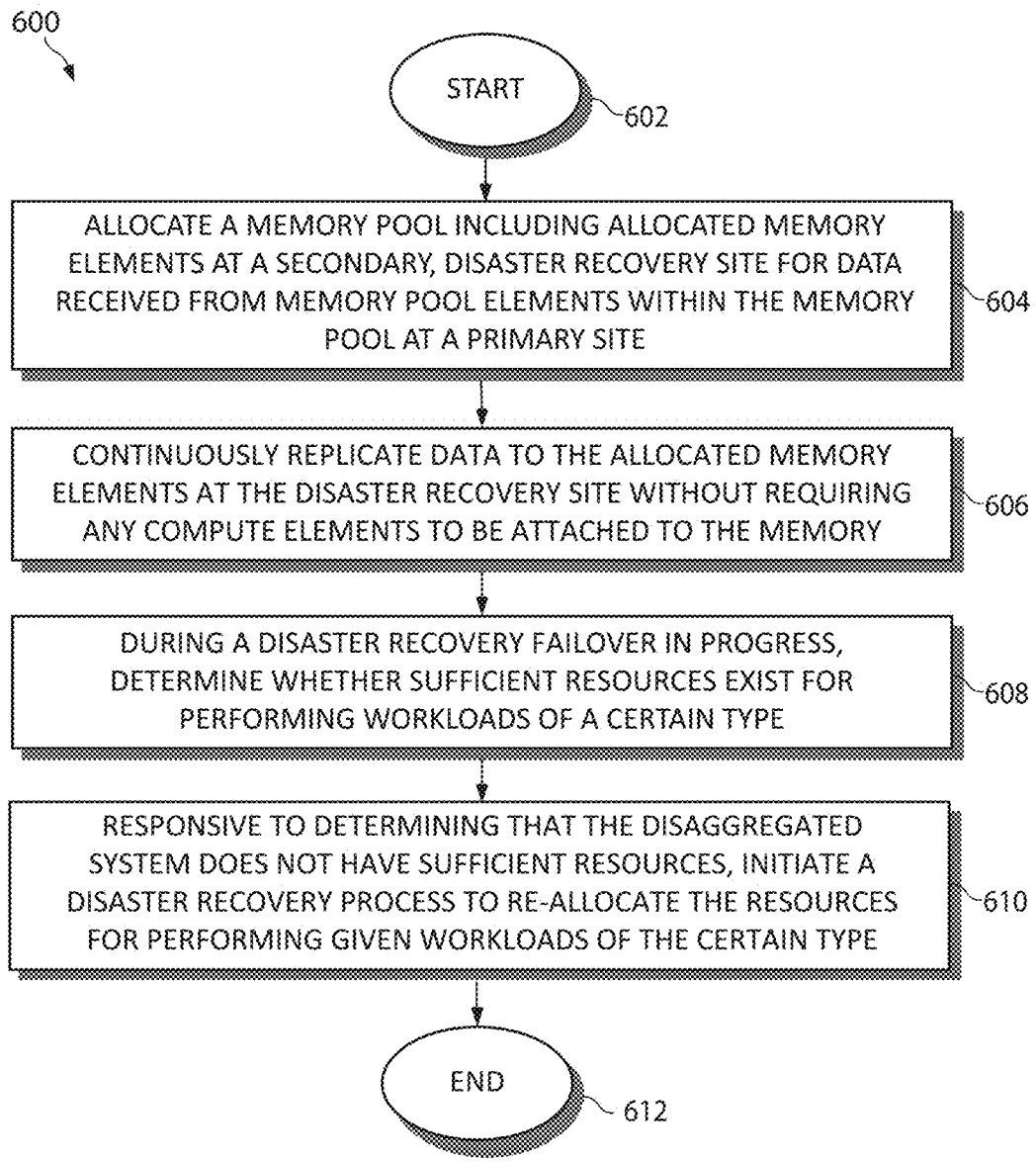
FIG. 6 is a flowchart diagram illustrating a method for disaster recovery in a disaggregated computing system, in accordance with various aspects of the present invention.

Generalizing these concepts, FIG. 6 illustrates a method 600 for disaster recovery in a disaggregated computing system. The method 600 (and all subsequent methods disclosed herein) may be performed in accordance with the present invention in any of the environments depicted in FIGS. 1-5, among others, in various embodiments. Of course, more or fewer operations than those specifically described in FIG. 6 may be included in the methods, as would be understood by one of skill in the art upon reading the present descriptions.

Each of the steps of the method 600 (and all subsequent methods disclosed herein) may be performed by any suitable component of the operating environment. For example, in various embodiments, the method 600 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a CPU, an Application Specific Integrated Circuit (ASIC), a Field Programmable Gate Array (FPGA), etc., combinations thereof, or any other suitable computing device known in the art.

The method 600 begins (step 602) by allocating a memory pool, wherein the memory pool includes allocated memory elements at a secondary, disaster recovery site for data received from memory pool elements within the memory pool at a primary site (step 604). Data is continuously replicated to the allocated memory elements at the disaster recovery site (step 606). In some embodiments, this replication is performed without requiring any compute resources to be attached to the allocated memory elements at the disaster recovery site (i.e., all replication processing is performed through compute/processing resources at the primary site and data is replicated directly into the memory elements at the disaster recovery site without first passing through a processor SMP). During a disaster recovery failover in progress, a determination is made whether there are sufficient resources in the disaggregated computing system for performing workloads of a certain type (step 608). If insufficient resources are available in the disaggregated computing system, a disaster recovery process is initiated to re-allocate the resources for performing given workloads of the certain type (step 610). The method 600 ends (step 612).

Figure 7:
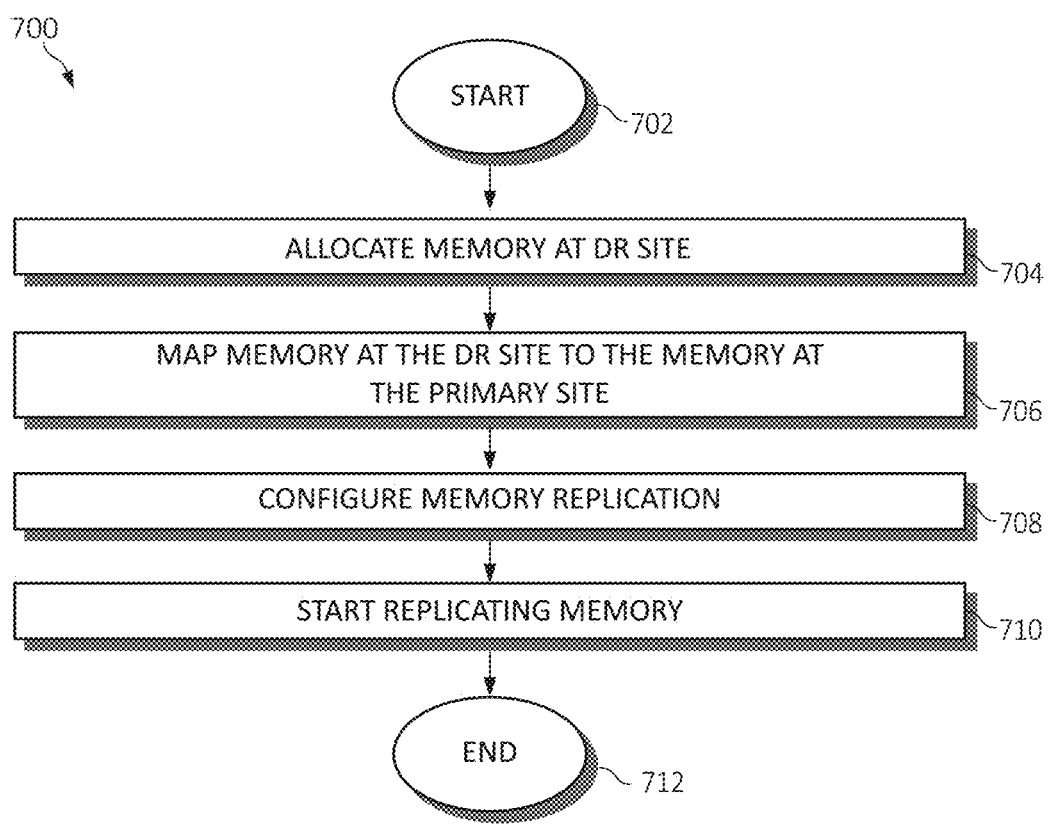
FIG. 7 is a flowchart diagram illustrating a method for initiating data replication for disaster recovery in a disaggregated computing system, in accordance with various aspects of the present invention.

The disaster recovery mechanisms contemplated by the present disclosure first begin with setting up the replication operations between the primary and disaster recovery sites (e.g., between the physical resources 200 comprising the primary site and the similar resources comprising the disaster recovery site 260 of FIG. 4). FIG. 7 is a flowchart diagram illustrating a method 700 for initiating this data replication for disaster recovery in the disaggregated architecture. The method 700 begins (step 702) by allocating memory at the disaster recovery site (step 704). This is performed by allocating, or setting aside, certain memory modules (or portions thereof) of the memory pool 208 of the resources of the disaster recovery site 260 for data received from the physical resources 200 of the primary site.

Once the memory modules (or portions thereof) have been allocated at the disaster recovery site for the purposes of receiving image data from the memory of the primary site, the memory of the disaster recovery site is then mapped to the memory at the primary site (step 706). Memory replication is then configured between the primary site and the disaster recovery site (step 708) and the replication is started between the primary and disaster recovery site (step 710). Again, this replication is initiated to include image data such as workload data and state data of the state of the operating system/workload from the primary site to the disaster recovery site. Because the state data is replicated, this ensures consistency as to what point in execution the workload is or was currently performing which may be quickly resumed should the workload need to be failed over from the primary site to the disaster recovery site during a disaster scenario. The method 700 ends (step 712).

Figure 8:
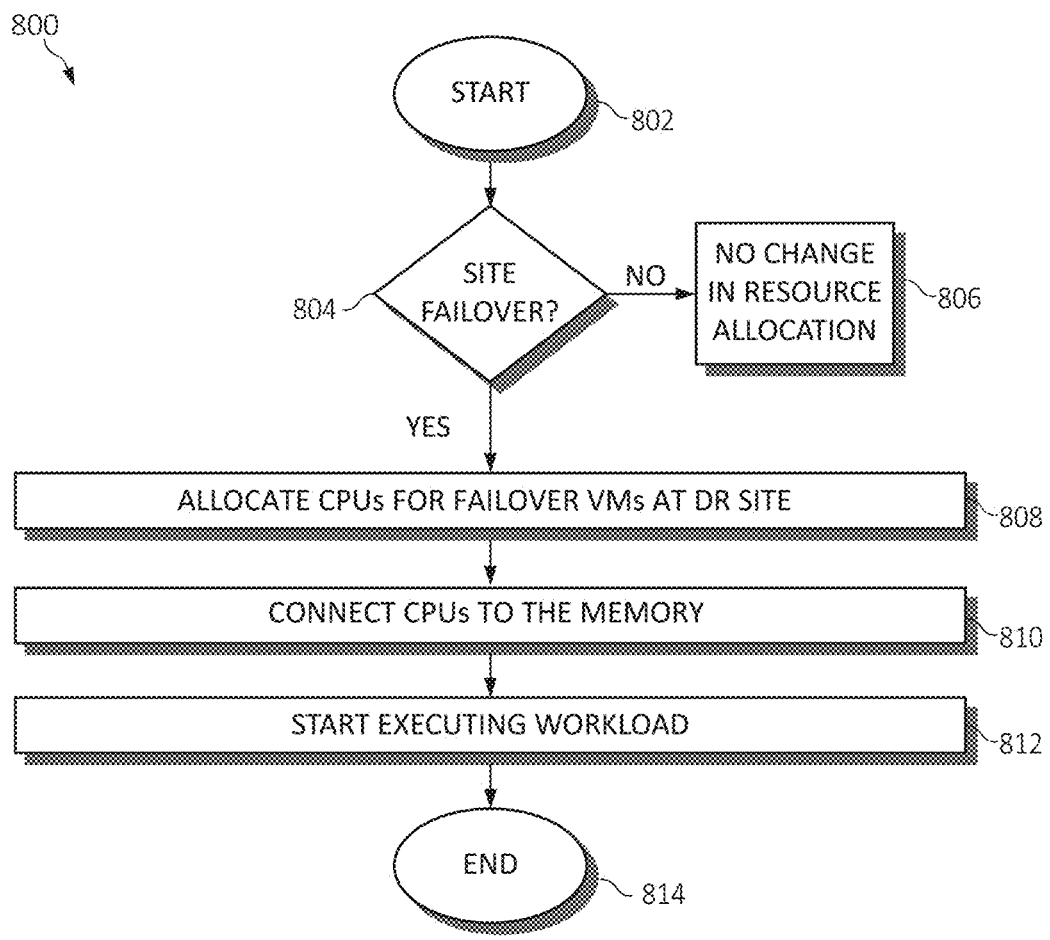
FIG. 8 is a flowchart diagram illustrating a method for performing site failover for disaster recovery in a disaggregated computing system, in accordance with various aspects of the present invention.

Advancing, FIG. 8 is a flowchart diagram illustrating a method 800 for performing site failover for disaster recovery in the disaggregated architecture. Once the replication between the primary and disaster recovery sites has been initiated, the method 800 begins (step 802) by determining whether a site failover is imminent or in progress (step 804). If systems are operating normally and no failover is underway at step 804, no changes in resource allocations are made at the disaster recovery site, and the data from the primary site continues to be transmitted and updated within the allocated memory resources at the disaster recovery site (step 806). If, however, a failover is determined to be imminent or in progress at step 804, an allocation process is performed to initiate allocating compute resources (i.e., CPUs) for failover VMs at the disaster recovery site (step 808). The allocation process first begins with allocating free compute resources which are not attached nor associated with any currently executing workload, however, as will be described in detail following, additional algorithms are provided for allocating compute resources based on a priority of the workload the compute resource is currently executing at the disaster recovery site in relation to the priority of the failover workload from the primary site. Once the allocation process has completed at step 808 and compute resources have been allocated to failover VMs at the disaster recovery site, the compute resources are then dynamically connected to the allocated memory holding the replication data from the primary site to form a dynamically constructed disaggregated server (step 810), and the failover workloads thereof are executed based, again, on a priority associated with each workload received from the primary site (step 812). The method 800 ends (step 814).

In some implementations, when allocating compute resources to workloads in the case of a disaster, there may not be sufficient compute resources at the disaster recovery site to accommodate the needs of all failover workloads from the primary site while continuing to execute the normally operational workloads at the disaster site (or portions thereof). In this case, the SLAs of the workloads are considered. The SLAs of each workload are generally defined in advance through an agreement between the operator of the datacenter and the requestor of the workload. These can include high, medium, and low priority workloads characterized in a number of different variations according to the resources allocated to the given workload per its SLA. In addition to the different levels of SLAs assigned to workloads, an additional disaster recovery SLA may be defined. This disaster recovery SLA defines the priority of the workload in the case of disaster, and can be different that the workload priority agreed upon during normal operation and execution of the given workload.

During the failover phase, if there are insufficient resources to accommodate all resources for performing both the workloads normally operating at the disaster recovery site in addition to the failover workloads taken on by the disaster recovery site from the primary site, the opportunistic workloads (i.e., workloads which are normally performed when no workloads with higher SLA level are executing) at the disaster recovery site are first shut down or otherwise suspended. As next, other workloads with lower priority SLAs and without disaster recovery SLA designations are shut down or suspended in order of their given priority.

Figure 9:
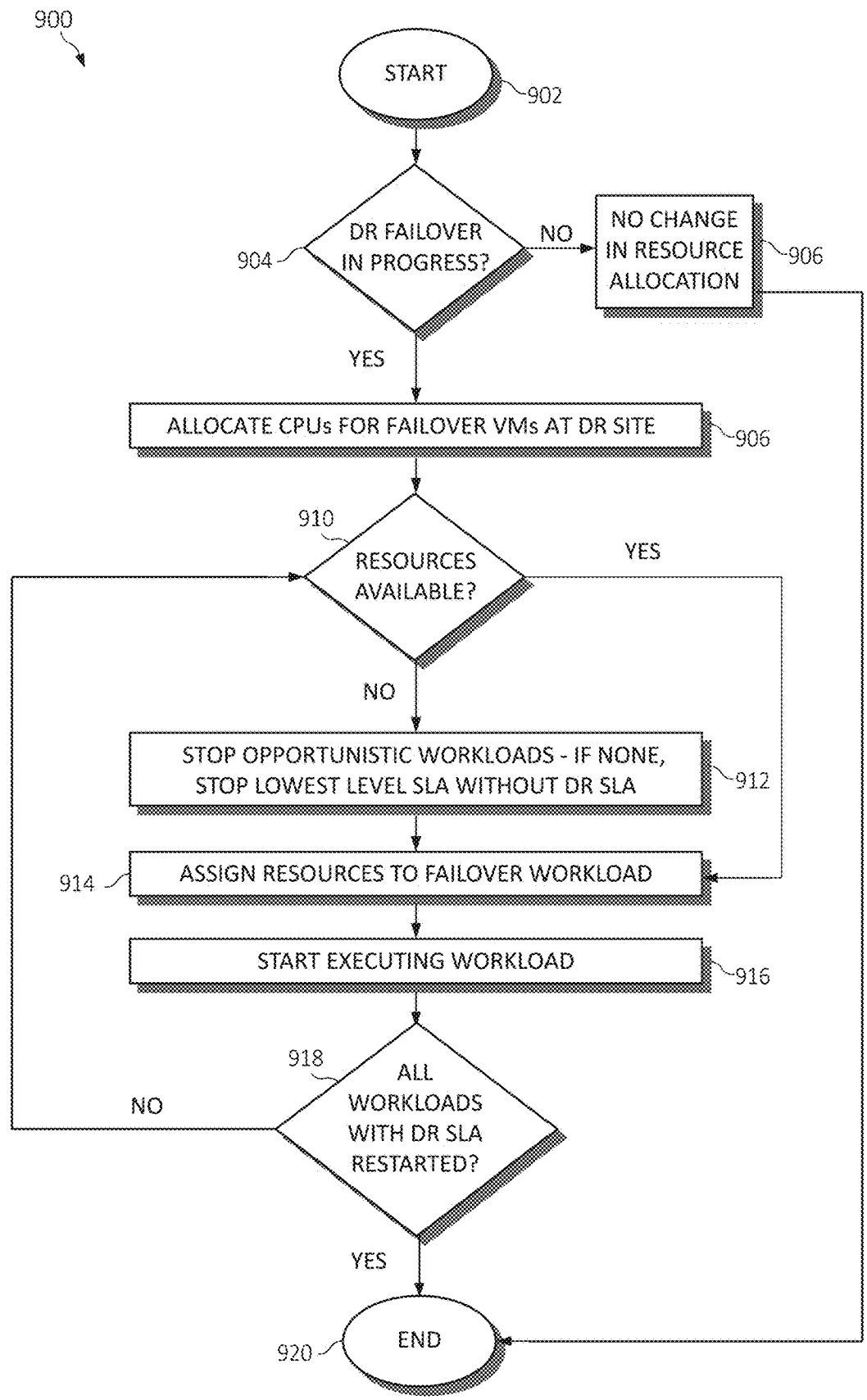
FIG. 9 is a flowchart diagram illustrating a method for allocating resources for disaster recovery in a disaggregated computing system, in accordance with various aspects of the present invention.

FIG. 9 is a flowchart diagram illustrating a method 900 for allocating resources for disaster recovery in the disaggregated architecture, in accordance with defined SLA priorities associated with respective workloads executed therein. The method 900 begins (step 902) by determining whether a disaster recovery failover is imminent or in progress (step 904). If, at step 904, no failover from the primary site is detected by the disaster recovery site, no changes in resource allocations thereof are made (step 906), and the method 900 ends (step 920). Returning to step 904, if a disaster recovery failover from the primary site to the disaster recovery site is determined to be imminent or in progress, the allocation process discussed previously is performed to initiate allocating compute resources (i.e., CPUs) for failover VMs at the disaster recovery site (step 906). A determination is then made as to whether the compute resources are available at the disaster recovery site to allocate to the memory holding the image data replicated from the primary site to commence execution on failover workloads (step 910).

If, at step 910, it is determined that compute resources at the disaster recovery site are not available to assign to a first failover workload received from the primary site, opportunistic workload(s) (workloads not having an SLA) at the disaster recovery site are first shut down or suspended to free the compute resources associated thereof (step 912). These freed compute resources are then assigned first to the first failover workload from the primary site having a disaster recovery SLA designation. If no opportunistic workloads exist to be shut down or suspended, or upon suspending all opportunistic workloads and identifying that insufficient free compute resources exist to execute the first (or subsequent) failover workload(s) received from the primary site having the disaster recovery SLA designation, workloads normally executing at the disaster recovery site having a lowest priority SLA are next shut down and suspended (and the next lowest, and so on). Similarly, the compute resources freed from these workloads normally executing at the disaster recovery site are then assigned to the first failover workload received from the primary site having the disaster recovery SLA designation (step 914), and the execution of the first failover workload is commenced (step 916). A determination is then made as to whether all failover workloads received from the primary site with the disaster recovery SLA designation have been restarted (step 918), where if all failover workloads have successfully been restarted, the method 900 ends (step 920). If, at step 918, additional failover workloads exist having the disaster recovery SLA designation, the method 900 returns to step 910, where it is determined whether compute resources exist to commence execution on a second or otherwise subsequent failover workload. If no resources exist, the method 900 frees resources from the next-lowest priority workload normally executing at the disaster recovery site until all failover workloads with the disaster recovery SLA designation have been restarted at the disaster recovery site.

Returning to step 910, if the compute resources do exist and are freely available, these compute resources are then attached to the memory holding the workload data from the primary site such that they are assigned to the failover workload (step 914), the execution of the failover workload is commenced (step 916), the determination is made as to whether all failover workloads with the disaster recovery SLA designation have been restarted (step 918), and if so, the method 900 ends (step 920).

In some embodiments, the disaster recovery system of the present disclosure may also incorporate an orchestration mechanism (or simply, "orchestrator") to simplify and automate the disaster recovery process and to manage recovery workflows. The orchestrator may provide a graphical user interface (GUI) having a central dashboard which allows monitoring recovery process by a user or system administrator. This recovery progress may include characteristics and health information regarding the infrastructure of the primary and disaster recovery sites, as well as provide real-time monitoring of the status of executing workloads and applications. The orchestrator may also be used for periodic disaster recovery testing between the primary and secondary, disaster recovery sites.

Additionally, in some embodiments, the disclosed disaster recovery system incorporates capacity planning mechanisms to ensure sufficient resources (memory, compute, and storage resources or otherwise) across one or more target datacenters exist to readily handle an actual disaster recovery scenario. This capacity planning functionality may also be incorporated as part of the orchestrator, or as an additional stand-alone interface. As mentioned, upon failover, resources are removed from the opportunistic workloads at the disaster recovery site. In order to host all failover workloads having the disaster recovery SLA designation from the primary site, the disaggregated architecture needs to ensure that there will be the sufficient number of opportunistic workloads in the system to suspend. Thus, when signing up users with disaster recovery capability for given workloads, it may be determined in case of a failure how much capacity (in terms of an amount of memory and compute resources are needed for the given workload, among other resources) may be required on the disaster recovery site such that the provisioning of the opportunistic workloads may be planned to a certain degree of estimation. This capacity must be adjusted as the configuration of the workloads at the primary site changes, as the amount of workloads that require a disaster recovery SLA may change over time. For example, additional workloads having the disaster recovery SLA may be added to the system or some workloads may not require the disaster recovery SLA anymore. For this reason, opportunistic workloads may be planned within the capacity planning interface to add or remove the opportunistic workloads at the disaster recovery site commensurate with the number, size, and scope of the workloads having the disaster recovery SLA designation executed at the primary site.

In some embodiments, this may be employed by purposely not assigning specific resources to the fullest specification of the given workloads, but rather at a reduced rate. For example, not all CPU cores as requested may be assigned to a respective workload, but rather a smaller number may be allocated in order to allow additional workloads to run. Then subsequently, with time, as more resources become available, the number of CPUs, accelerators, and other resources per workload may be increased to its original set size. That is, at any certain time, especially considering opportunistic workloads, the capacity planning mechanisms may regulate the quantity, type, and scope of differing resources allowed to be allocated to certain workloads at the disaster recovery site to ensure that, in the event of a disaster scenario, all of the estimated failover workloads having the disaster recovery SLA received from the primary site will have enough resources to execute properly given the opportunistic workloads of the disaster recovery site are suspended or shut down, and the resources assigned thereto are re-allocated to the failover workloads having the disaster recovery SLA designation received from the primary site.

The present invention may be an apparatus, a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for disaster recovery in a disaggregated computing system, by a processor, comprising:
   allocating a memory pool, wherein the memory pool includes allocated memory elements at a secondary, disaster recovery site for data received from memory pool elements within the memory pool at a primary site;
   continuously replicating data to the allocated memory elements at the disaster recovery site, wherein compute resources are physically disconnected from the allocated memory elements at the disaster recovery site during the replicating;
   during a disaster recovery failover in progress, connecting and assigning the compute resources to the allocated memory elements in real-time, and determining whether there are sufficient resources in the disaggregated computing system for performing workloads of a certain type; and
   responsive to determining that the disaggregated computing system does not have sufficient resources, initiating a disaster recovery process to re-allocate the resources for performing given workloads of the certain type.

2. The method of claim 1, wherein the disaster recovery failover includes ceasing execution of the given workloads of the certain type at the primary site and resuming the execution of the given workloads of the certain type at the disaster recovery site.

3. The method of claim 1, wherein:
   the workloads of the certain type comprise workloads subject to a disaster recovery service level agreement (SLA); and
   the continuously replicated data includes workload data associated with the workloads of the certain type.

4. The method of claim 3, wherein initiating the disaster recovery process includes:
   first suspending opportunistic workloads at the disaster recovery site;
   enabling the disaster recovery SLA from the primary site and releasing the resources which were used to execute the suspended opportunistic workloads; and
   assigning the resources previously assigned to the opportunistic workloads to a respective failover workload comprising one of the workloads having the disaster recovery SLA.

5. The method of claim 4, further including, subsequent to assigning the resources previously assigned to the opportunistic workloads:
   determining whether the resources are sufficient to execute the respective failover workload;
   responsive to determining the resources are insufficient, suspending workloads having a lowest priority SLA, releasing the resources used to execute the workloads having the lowest priority SLA, and allocating the resources previously assigned to the workloads having the lowest priority SLA to the respective failover workload; and
   executing the respective failover workload using the allocated resources.

6. The method of claim 5, further including, responsive to allocating resources previously assigned to the workloads having the lowest priority SLA and determining the resources continue to be insufficient for performing the respective failover workload, suspending workloads having a next-lowest priority SLA at the disaster recovery site and allocating the resources used for the performance thereof to the respective failover workload.

7. The method of claim 5, further including, subsequent to executing the respective failover, determining whether all workloads having the disaster recovery SLA have been restarted at the disaster recovery site; and performing the disaster recovery process for a next respective failover workload until all the workloads having the disaster recovery SLA have been restarted.

8. A system for disaster recovery in a disaggregated computing system, the system comprising:

a memory pool, and at least one processor, wherein the at least one processor:

allocates the memory pool, wherein the memory pool includes allocated memory elements at a secondary, disaster recovery site for data received from memory pool elements within the memory pool at a primary site;

continuously replicates data to the allocated memory elements at the disaster recovery site, wherein compute resources are physically disconnected from the allocated memory elements at the disaster recovery site during the replicating;

during a disaster recovery failover in progress, connects and assigns the compute resources to the allocated memory elements in real-time, and determines whether there are sufficient resources in the disaggregated computing system for performing workloads of a certain type; and responsive to determining that the disaggregated computing system does not have sufficient resources, initiates a disaster recovery process to re-allocate the resources for performing given workloads of the certain type.

9. The system of claim 8, wherein the disaster recovery failover includes ceasing execution of the given workloads of the certain type at the primary site and resuming the execution of the given workloads of the certain type at the disaster recovery site.

10. The system of claim 8, wherein:

the workloads of the certain type comprise workloads subject to a disaster recovery service level agreement (SLA); and the continuously replicated data includes workload data associated with the workloads of the certain type.

11. The system of claim 10, wherein initiating the disaster recovery process includes:

first suspending opportunistic workloads at the disaster recovery site;

enabling the disaster recovery SLA from the primary site and releasing the resources which were used to execute the suspended opportunistic workloads; and assigning the resources previously assigned to the opportunistic workloads to a respective failover workload comprising one of the workloads having the disaster recovery SLA.

12. The system of claim 11, wherein the processor, subsequent to assigning the resources previously assigned to the opportunistic workloads:

determines whether the resources are sufficient to execute the respective failover workload;

responsive to determining the resources are insufficient, suspends workloads having a lowest priority SLA, releases the resources used to execute the workloads having the lowest priority SLA, and allocates the resources previously assigned to the workloads having the lowest priority SLA to the respective failover workload; and executes the respective failover workload using the allocated resources.

13. The system of claim 12, wherein the processor, responsive to allocating resources previously assigned to the workloads having the lowest priority SLA and determining the resources continue to be insufficient for performing the respective failover workload, suspends workloads having a next-lowest priority SLA at the disaster recovery site and allocates the resources used for the performance thereof to the respective failover workload.

14. The system of claim 12, wherein the processor, subsequent to executing the respective failover, determines whether all workloads having the disaster recovery SLA have been restarted at the disaster recovery site; and performs the disaster recovery process for a next respective failover workload until all the workloads having the disaster recovery SLA have been restarted.

15. A computer program product for disaster recovery in a disaggregated computing system, by a processor, the computer program product embodied on a non-transitory computer-readable storage medium having computer-readable program code portions stored therein, the computer-readable program code portions comprising:

an executable portion that allocates a memory pool, wherein the memory pool includes allocated memory elements at a secondary, disaster recovery site for data received from memory pool elements within the memory pool at a primary site;

an executable portion that continuously replicates data to the allocated memory elements at the disaster recovery site, wherein compute resources are physically disconnected from the allocated memory elements at the disaster recovery site during the replicating;

an executable portion that, during a disaster recovery failover in progress, connects and assigns the compute resources to the allocated memory elements in real-time, and determines whether there are sufficient resources in the disaggregated computing system for performing workloads of a certain type; and an executable portion that, responsive to determining that the disaggregated computing system does not have sufficient resources, initiates a disaster recovery process to re-allocate the resources for performing given workloads of the certain type.

16. The computer program product of claim 15, wherein the disaster recovery failover includes ceasing execution of the given workloads of the certain type at the primary site and resuming the execution of the given workloads of the certain type at the disaster recovery site.

17. The computer program product of claim 15, wherein:

the workloads of the certain type comprise workloads subject to a disaster recovery service level agreement (SLA); and the continuously replicated data includes workload data associated with the workloads of the certain type.

18. The computer program product of claim 17, wherein initiating the disaster recovery process includes:

first suspending opportunistic workloads at the disaster recovery site;

enabling the disaster recovery SLA from the primary site and releasing the resources which were used to execute the suspended opportunistic workloads; and assigning the resources previously assigned to the opportunistic workloads to a respective failover workload comprising one of the workloads having the disaster recovery SLA.

19. The computer program product of claim 18, further including an executable portion that, subsequent to assigning the resources previously assigned to the opportunistic workloads:
- determines whether the resources are sufficient to execute the respective failover workload;
- responsive to determining the resources are insufficient, suspends workloads having a lowest priority SLA, releases the resources used to execute the workloads having the lowest priority SLA, and allocates the resources previously assigned to the workloads having the lowest priority SLA to the respective failover workload; and
- executes the respective failover workload using the allocated resources.

20. The computer program product of claim 19, further including an executable portion that, responsive to allocating resources previously assigned to the workloads having the lowest priority SLA and determining the resources continue to be insufficient for performing the respective failover workload, suspends workloads having a next-lowest priority SLA at the disaster recovery site and allocates the resources used for the performance thereof to the respective failover workload.

21. The computer program product of claim 19, further including an executable portion that, subsequent to executing the respective failover, determines whether all workloads having the disaster recovery SLA have been restarted at the disaster recovery site; and
- performs the disaster recovery process for a next respective failover workload until all the workloads having the disaster recovery SLA have been restarted.

\* \* \* \* \*